United States Patent [19]
Demeules

[11] 3,803,775
[45] Apr. 16, 1974

[54] SABER SAW BRACKET
[76] Inventor: Hector Z. Demeules, 740 Altura St., Minneapolis, Minn. 33452
[22] Filed: July 24, 1972
[21] Appl. No.: 274,734

[52] U.S. Cl............. 51/241 R, 51/170 MT, 144/1 E
[51] Int. Cl...................... B24b 19/00, B23b 23/00
[58] Field of Search............ 51/241 R, 170 MT, 56; 144/1 E, 35 A

[56] References Cited
UNITED STATES PATENTS
2,526,976  10/1950  Smith.................................. 144/1 E
2,933,864  4/1960  Marshall............................ 51/241 R
3,530,577  9/1970  Franklin et al................ 51/170 MT

*Primary Examiner*—Othell M. Simpson
*Attorney, Agent, or Firm*—L. A. MacEachron

[57] ABSTRACT

A universal bracket for saber saws to convert hand-held saber saws to a table tool. A table supporting plate and saber saw shoe plate are secured to opposite ends of a tube that slidably supports a bearing like tool carrier which links the saber saw, via a blade like member, to a tool extending above the table supporting plate.

3 Claims, 3 Drawing Figures

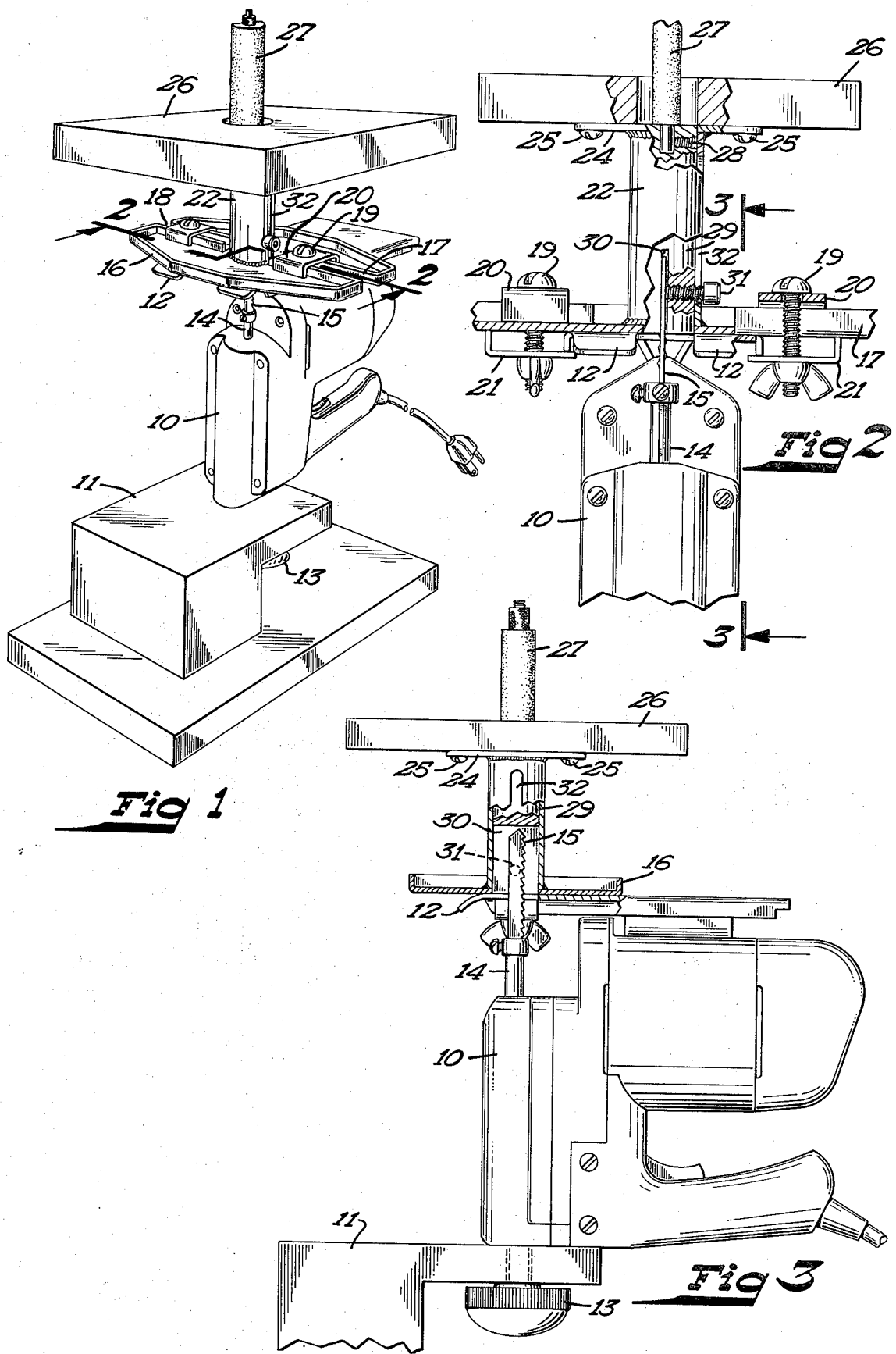

SABER SAW BRACKET

PRIOR ART

No very close prior art is known to applicant, but the broad idea of supplying tables to convery hand-held tools into table tools is not new. A search disclosed no patents on such structures. The closest art known to applicant is, perhaps, a special power unit that can be used with a fair variety of different tools, but only those designed specifically to be used with the power unit. In short, it is a closed system that offers no aid to one who already has a saber saw of a different make and one who prefers some other power unit. Everything else in the prior art known to applicant consists of expensive and elaborate tools approaching production machinery in character for converting drill presses and other large tools to different types of work.

SUMMARY

The universal adapter bracket of this invention is a reciprocating tool carrier in a supporting tube one end of which has a plate for supporting a table and the other a plate with clamps for securing it to a saber saw shoe. The shoe plate is slotted permitting the clamps to adjust to a great variety of shoe size. Any suitable means may be used to hold the saw in an inverted position and any suitable table may be screwed to the table support plate. The tool support has a slot in it that will accept a saber saw blade or any blade or blade-like piece of material of similar thickness and width. In the tool carrier is a means for clamping the blade against the side of the tool carrier slot. In this way any blade can be used to link the tool carrier to the saw blade carrier of the saber saw. The usual hand-held saber saw is thus converted into a table power tool that can drive a variety of tools substantially greater in number than the saw alone can accommodate. The preferred embodiment of the invention is shown in the drawings herewith and they are briefly described below.

DRAWINGS

FIG. 1 is a perspective view of a saber saw using the conversion bracket,

FIG. 2 is a fragmentary, enlarged view taken on the line 2—2 of FIG. 1; portions have been broken away to show internal construction, and FIG. 3 is a side elevation of the structure shown in FIG. 1 but taken on the line 3—3 of FIG. 2; FIG. 3 is drawn to a scale between those used in FIGS. 1 and 2.

DETAILED DESCRIPTION

In FIG. 1, a saber saw 10 is supported by a suitable stand 11 so that it is held in an upside down position from that in which it is commonly used to saw. In the example shown, the knob 13 is screwed onto the saw through a hole in the stand 11. In this position, the shoe 12, of which only a small portion is visible, is above the blade carrier 14. A blade 15, or a flat piece of suitable material of similar thickness and width, is inserted in the blade carrier and secured there. Resting on the shoe 12 is a plate 16, hereafter called the shoe plate to distinguish it from another portion of the device that is also appropriately called a plate.

The shoe plate 16 is appropriately secured to the shoe of the saber saw by a clamping means. It can be seen that there are two slots in the shoe plate at 17 and 18. These slots extend laterally. In each slot is a bolt or screw threaded member such as the one 19 in slot 17. An upper clamping member 20 engages the shoe plate 16 and the lower clamping member 21 engages with one end the bottom of the shoe plate and with its other the bottom of the shoe as the saw is here positioned. The lower clamp members are seen only in FIG. 2.

Returning to FIG. 1, a tube 22 is secured to the shoe plate 16. It registers with a hole in the shoe plate. A second plate 24 (FIG. 2) is similarly secured to the top of the tube 22. The second plate is called the table support plate and appears in FIGS. 2 and 3. Returning once more to FIG. 1, any suitable table 26 is secured to the table support plate and a hole in the table registers with the hole in table support plate that registers with the tube opening. A reciprocating tool such as the sanding mandrel 27 protrudes through the hole in the table.

Turning now to FIG. 2, the table 26 is seen to be secured to the plate 24 by means of screws 25. In this figure, the tube 22 is seen to contain a tool carrier 29 which has a slot 30 into which the blade 15 is inserted. A suitable lateral pressure means such as the set screw 31 is used to force the blade 15 into tight contact with the side of the slot 30. This secures the blade 15 within the slot and thus interconnects the tool carrier 29 and the blade carrier 14 of the saber saw 10. Tool carrier 29 is made from a material that is softer than tool steel so that if a good cutting blade is used at 15, the teeth of it will not be damaged by being forced against the side of slot 30. If the tube 22 is made of steel as is desirable for both strength and rigidity, the tool carrier 29 is suitably made from one of the bearing alloys which provides a smooth working combination. It is not necessary to use a saw blade for this connection, as any blade like piece of material of similar width and thickness will function. The teeth of a saw blade do aid in preventing slippage between the blade and the tool carrier 29. Any suitable means such as set screw 28 may be employed to secure the tool, in this case the sanding mandrel 27, to the tool carrier 29. Such a securing means permits the use of a wide variety of tools with the tool carrier 29 which expands the work capability of the saber saw. The set screw 31 extends through an opening 32 in the side of tube 22.

OPERATION

In this case, under this heading it seems more appropriate to describe how the device is secured to a saber saw in preparation for use than to describe actual use which is rather obvious. Saber saw 10 is first secured to the base 11. In this case the base is one that is adaptable to saber saws that have a removable knob such as the one 13 in FIG. 3. How the saw is supported in an inverted, vertical position is not critical to this invention so long as the saw is so supported. A blade such as the one 15 is then inserted in either the blade holder 14 or the tool carrier slot 30. In either case the blade is secured in the choosen device. The adapter unit is then presented to the shoe 12 of the saw 10 and maneuvered around until the blade 15 fits into whichever of the two blade receiving devices was not used initially. The clamping devices like the ones designated 19–21 are manipulated until they engage the shoe of the saw 10 at which time the wing nuts are tightened. If the table 26 has not previously been secured, it is secured at this time. If the appropriate tool has not been secured to the tool carrier 29, it is done by releasing the tool carrier from the blade 15 and the tube 22 by removing the set screw 31 altogether. The carrier 29 can then be removed and the appropriate tool inserted. Thus the important link between the saber saw and a table for various kinds of power tool work can be effected by a universally applicable bracket structure. The saw support and table are easily constructed by anyone of sufficient skill and interest in tools to want one of the brackets.

I claim:

1. A table structure for converting a saber saw to perform other operations; the table structure comprising:

A. a table support plate having an opening,
B. a tube one end of which is secured to said table support plate at said opening,
C. a shoe plate having an opening secured to and registering with the other end of said tube,
D. means for clamping said shoe plate to the shoe of a saber saw,
E. a tool carrier slidably mounted in said tube,
F. Means on said tool carrier for securing a tool to said carrier at its table support end, and
G. means at the shoe plate end of said tool carrier for securing a blade thereto.

2. The table structure of claim 1 in which said shoe plate has opposed slots, said clamping means extending through said slots to engage a saw shoe in a variety of widths within the length of the slots.

3. The table structure of claim 1 in which said tool carrier is of a material less hard that the tool steel of a saber saw blade and said means for securing a blade to said tool carrier at ist shoe plate end comprises: said tool carrier having a vertical slot in it and a lateral pressure means secured to said tool carrier and operative in said slot to force the blade against the side of the slot.

* * * * *

UNITED STATES PATENT OFFICE
CERTIFICATE OF CORRECTION

Patent No. 3,803,775     Dated April 16, 1974

Inventor(s) Hector Z. Demeules

It is certified that error appears in the above-identified patent and that said Letters Patent are hereby corrected as shown below:

On the cover sheet [76] "Minneapolis, Minn. 33452"

should read -- Port St. Lucie, Florida 33452 --.

Signed and sealed this 24th day of September 1974.

(SEAL)
Attest:

McCOY M. GIBSON JR.
Attesting Officer

C. MARSHALL DANN
Commissioner of Patents